United States Patent
Klinger et al.

(10) Patent No.: US 9,234,572 B2
(45) Date of Patent: Jan. 12, 2016

(54) WHEEL WITH A FLEXIBLE TOOTHING

(71) Applicant: OMEGA SA, Biel/Bienne (CH)

(72) Inventors: Laurent Klinger, Bienne (CH); David Benjamin Kraehenbuehl, Grenchen (CH); Thomas Stoeckli, Lueterkofen (CH)

(73) Assignee: OMEGA SA, Biel/Bienne (CH)

( * ) Notice: Subject to any disclaimer, the term of this patent is extended or adjusted under 35 U.S.C. 154(b) by 343 days.

(21) Appl. No.: 13/906,847

(22) Filed: May 31, 2013

(65) Prior Publication Data

US 2013/0333504 A1    Dec. 19, 2013

(30) Foreign Application Priority Data

Jun. 4, 2012    (EP) .................................... 12170705

(51) Int. Cl.
*G04B 13/02*    (2006.01)
*F16H 55/18*    (2006.01)
*F16H 55/16*    (2006.01)
*G04B 35/00*    (2006.01)

(52) U.S. Cl.
CPC ................ *F16H 55/18* (2013.01); *F16H 55/16* (2013.01); *G04B 13/025* (2013.01); *G04B 13/027* (2013.01); *G04B 35/00* (2013.01); *Y10T 74/19623* (2015.01)

(58) Field of Classification Search
CPC ......... F16H 55/18; G04B 19/02; G04B 13/02
See application file for complete search history.

(56) References Cited

U.S. PATENT DOCUMENTS

| | | | | |
|---|---|---|---|---|
| 7,258,037 B2* | 8/2007 | Wiederrecht | ................... | 74/461 |
| 7,406,892 B2* | 8/2008 | Takeuchi et al. | ................ | 74/440 |
| 7,633,837 B2* | 12/2009 | Daout | ........................... | 368/220 |
| 8,011,267 B2* | 9/2011 | Scheufele | ....................... | 74/461 |
| 8,042,423 B2* | 10/2011 | Bannier et al. | .................. | 74/461 |
| 8,468,904 B2* | 6/2013 | Nowicki | ......................... | 74/461 |
| 8,904,894 B2* | 12/2014 | Geiser | ............................. | 74/409 |
| 2006/0048596 A1 | 3/2006 | Wiederrecht | | |

(Continued)

FOREIGN PATENT DOCUMENTS

DE    10 2004 037 540 A1    3/2006
DE    20 2011 101 577 U1    1/2012

(Continued)

OTHER PUBLICATIONS

European Search Report issued Nov. 22, 2012, in European Patent Application No. 12170705, filed Jun. 4, 2012.

*Primary Examiner* — Sean Kayes
(74) *Attorney, Agent, or Firm* — Oblon, McClelland, Maier & Neustadt, L.L.P.

(57) ABSTRACT

Timepiece wheel (10) comprising teeth (2) with play compensation each including a catch (3) projecting from a catch foot (31), and an elastic strip (4) projecting from a strip foot (41) opposite said catch (3) from which said strip (4) is separated by a ventral notch (5) and an intrados profile (43) of which, on the side opposite said catch (3), delimits a dorsal notch (6), said strip foot (41) being delimited, towards the pivot axis (D) of said wheel (10), by an inner end (51) of said ventral notch (5) and by an inner end (61) of said dorsal notch (6).
Said inner end (61) is located closer to said axis (D) than said inner end (51) and extends, on the side of said axis (D) underneath said catch foot (31) or underneath the inner extension (52) of said ventral notch (5) towards said pivot axis (D).

13 Claims, 9 Drawing Sheets

(56) References Cited

U.S. PATENT DOCUMENTS

| | | |
|---|---|---|
| 2007/0180943 A1 | 8/2007 | Daout |
| 2008/0307915 A1 | 12/2008 | Scheufele |
| 2009/0260470 A1 | 10/2009 | Bannier et al. |
| 2010/0043578 A1 | 2/2010 | Daout |
| 2011/0079098 A1 | 4/2011 | Nowicki |
| 2011/0203397 A1 | 8/2011 | Bishop |

FOREIGN PATENT DOCUMENTS

| | | |
|---|---|---|
| EP | 1 380 772 A1 | 1/2004 |
| EP | 1 555 584 A1 | 7/2005 |
| EP | 2 003 522 A1 | 12/2008 |
| EP | 2 112 567 A1 | 10/2009 |
| WO | WO 2009/114477 A2 | 9/2009 |
| WO | WO 2010/063393 A1 | 6/2010 |

* cited by examiner

WHEEL WITH A FLEXIBLE TOOTHING

This application claims priority from European Patent Application No. 12170705.3 filed Jun. 4, 2012, the entire disclosure of which is incorporated herein by reference.

FIELD OF THE INVENTION

The invention concerns a timepiece wheel comprising teeth with play compensation each including a catch projecting from a catch foot, and an elastic strip projecting from a strip foot opposite said catch from which it is separated by a ventral notch and an intrados profile of which, on the side opposite said catch, delimits a dorsal notch, said strip foot being delimited, towards the pivot axis of said wheel, by an inner end of said ventral notch and by an inner end of said dorsal notch.

The invention also concerns a timepiece train comprising at least one wheel of this type.

The invention also concerns a timepiece movement including at least one train of this type.

The invention also concerns a timepiece including at least one timepiece movement of this type, and/or at least one train of this type.

The invention concerns the field of timepiece mechanisms, or scientific measuring equipment comprising a train.

BACKGROUND OF THE INVENTION

The manufacture of timepiece trains having gears with no backlash is complex, since this involves finding compatibility between optimum torque transmission with the best possible yield on the one hand, and good shock resistance on the other hand.

The solution of a flexible toothing, with each tooth comprising a rigid portion and an elastic portion, satisfactorily answers the problem of energy transmission but is less satisfactory as regards the problem of shock resistance. This is all the more true given that these flexible toothings are generally designed to be made of micro-machinable material, silicon or similar material, via a "LIGA" or similar method. EP Patent Application No. 2 112 567 A1 in the name of Rolex discloses a gear with backlash compensation comprising a wheel with flexible, elastic portions manufactured in this way.

SUMMARY OF THE INVENTION

The invention proposes to define a flexible wheel geometry, which can be made of micro-machinable material, silicon or similar material, via a "LIGA" or similar method, and satisfactorily answers the two problems raised of yield and shock resistance.

The invention therefore concerns a timepiece wheel comprising teeth with play compensation each including a catch projecting from a catch foot, and an elastic strip projecting from a strip foot opposite said catch from which it is separated by a ventral notch and an intrados profile of which, on the side opposite said catch, delimits a dorsal notch, said strip foot being delimited, towards the pivot axis of said wheel, by an inner end of said ventral notch and by an inner end of said dorsal notch, characterized in that said inner end of said dorsal notch is located closer to said axis than said inner end of said ventral notch, and extends, on the side of said axis, underneath said catch foot or underneath the inner geometrical extension of said ventral notch towards said pivot axis.

The invention further concerns a timepiece train comprising at least one wheel of this type, characterized in that said wheel is geared with an opposing pinion whose teeth comprise an area of maximum section arranged to cooperate in driving abutment with an external portion, substantially radial to said pivot axis of said wheel, of a said catch or of a said strip.

The invention also concerns a timepiece movement including at least one train of this type.

The invention also concerns a timepiece including at least one timepiece movement of this type, and/or at least one train of this type.

BRIEF DESCRIPTION OF THE DRAWINGS

Other features and advantages of the invention will appear upon reading the following detailed description, with reference to the annexed drawings, in which:

FIG. 8 shows a schematic plan view of a detail of the inner end of the dorsal and ventral notches of the wheel of FIG. 1, whereas

FIGS. 11 to 14 illustrate a particular version, wherein external portion of catch is forked and includes a first tooth and a second tooth bordering a hollow. These two teeth and are each much more rigid than elastic strip:

DETAILED DESCRIPTION OF PREFERRED EMBODIMENTS

The invention concerns the field of timepiece mechanisms, or scientific measuring equipment comprising a train.

The invention proposes to define a flexible wheel geometry, which can be made of micro-machinable material, silicon or similar material, via a "LIGA" or similar method, and which guarantees both a good yield and good shock resistance.

The invention concerns the improvement of the performance of this type of flexible toothing while respecting the limitations imposed by the manufacturing method. Indeed, to ensure sufficient resistance for the flexible strips, or simply teeth, of a wheel made of micro-machinable material and placed in a plate, amongst other constraints which are not detailed here, it is necessary to respect a minimum aspect ratio, i.e. a minimum width for the solid portions or hollow portions, relative to the thickness of the plate. This aspect ratio is usually comprised between 5 and 10, and is easier to produce the closer it is to 5. This aspect ratio is equally valid for the solid portions, such as elastic strips, and the hollow portions, slots or notches. Square re-entrant corners are prohibited, particularly at the bottom of the slots or notches. Generally, a minimum radius of curvature must be observed for every portion of the geometry of the part.

Thus, the invention concerns a timepiece wheel 10 comprising teeth 2 with play compensation. Each tooth 2 comprises a catch 3 projecting from a catch foot 31, and an elastic strip 4 projecting from a strip foot 41 opposite said catch 3, from which it is separated by a ventral notch 5. This strip 4 has an intrados profile 43 on the opposite side to said catch 3. Said intrados profile 43 delimits a dorsal notch 6. The strip foot 41 is delimited, towards pivot axis D of wheel 10, by an inner end 51 of ventral notch 5 and by an inner end 61 of dorsal notch 6.

According to the invention, inner end 61 of dorsal notch 6 is located closer to axis D than inner end 51, and extends, on the side of said axis D, underneath catch foot 31, or underneath the inner extension 52 of said ventral notch 5 towards pivot axis D. "Extension 52" refers here only to the geometric, curvilinear extension of the median profile of the ventral notch, represented in the Figures by a double dashed line, and not a particular component or profile of wheel 10.

More specifically, this wheel 10, for a timepiece mechanism, comprises at the periphery of a wheel body 11, a plurality of play compensation teeth 2 of variable geometry.

Each of these teeth 2 comprises at least one catch 3 attached in a cantilever arrangement to wheel body 11 via a catch foot 31, and at least one elastic strip 4 attached in a cantilever arrangement to wheel body 11 via a strip foot 41; said strip 4 is positioned opposite a catch 3 of this type from which it is separated by a ventral notch 5. Elastic strip 4 extends between an extra-dorsal profile 42 on the side of said catch 3 and an intrados profile 43 on the opposite side to said catch 3. The intrados profile 43 delimits a dorsal notch 6, which separates strip 4 from the rest of wheel 10. Strip foot 41 is delimited, on the one hand, by an inner end 51 of ventral notch 5 on the side of pivot axis D of wheel 10, and on the other hand by an inner end 61 of dorsal notch 6.

According to the invention, to allow catch 3 to bend, in the event of a shock to gear train 100 in which wheel 10 is incorporated, the inner end 61 of dorsal notch 6 is located closer to pivot axis D than the inner end 51 of ventral notch 5. The inner end 61 of dorsal notch 6 extends, on the side of pivot axis D, underneath catch foot 31 or underneath the inner extension 52 of ventral notch 5 towards pivot axis D.

Indeed, the constraints of making this type of wheel 10 in micro-machinable material require ventral notches 5 and dorsal notches 6 to be in curved at a radius at the internal ends thereof, respectively 51 and 61. The minimal value Rmin1 of this end radius is defined by the nature of the material and the thickness of the plate. Likewise, the value Rmin2 of any radius of curvature is also defined by the nature of the material and thickness of the plate.

Figure 2:
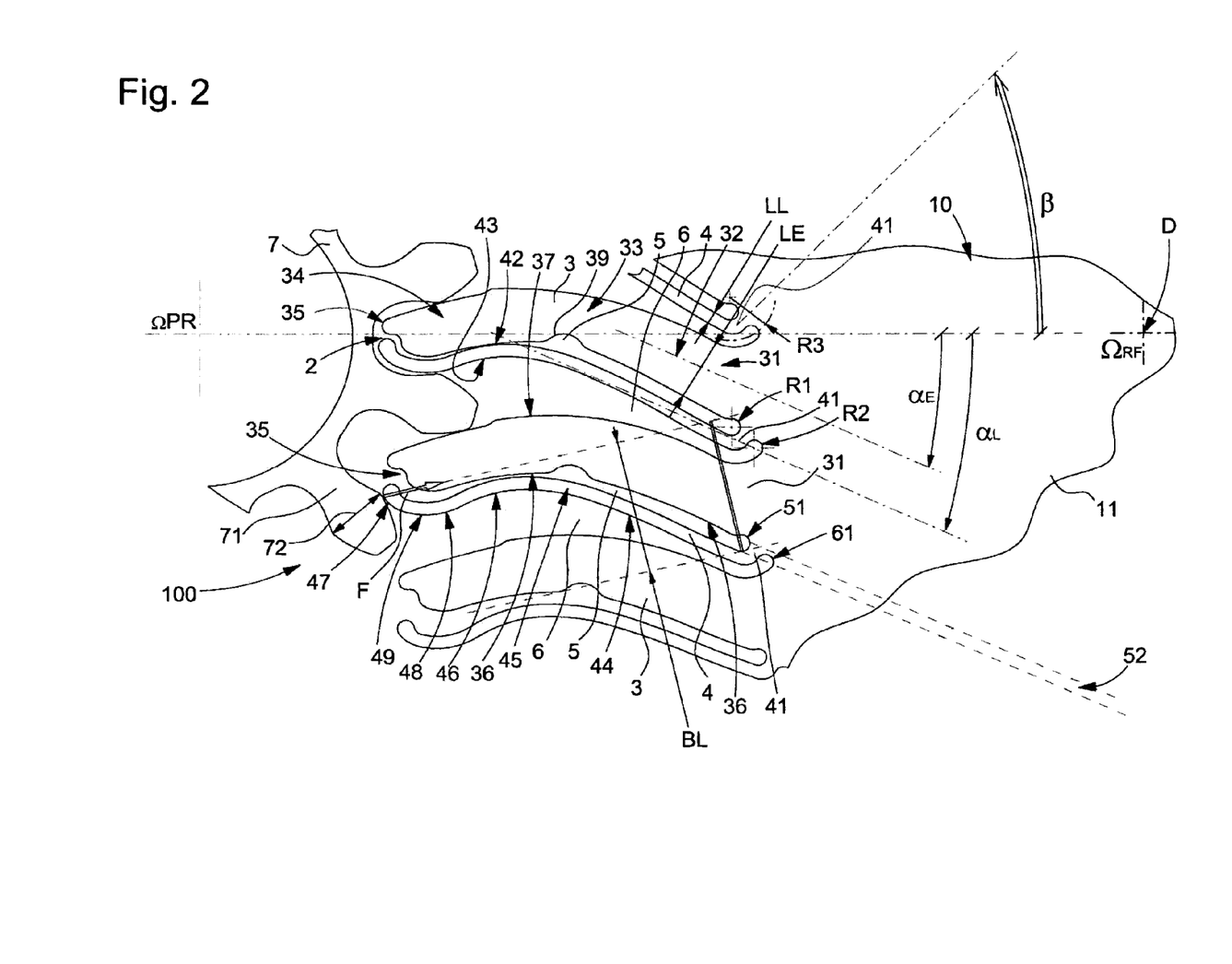
FIG. 2 shows a schematic plan view of a detail of the gearing area of a gear train comprising a wheel according to FIG. 1, and a rigid opposing pinion, wherein, on a first tooth, a catch and a strip are in contact with each other, whereas on a second tooth, the corresponding catch and strip are still remote from each other. An arrow symbolises the stress applied by a tooth of the rigid pinion on the flexible strip of said second tooth, and a double line represents the lever arm on which said thrust force is exerted, due to the particular configuration of said flexible strip surrounded by notches in a particular delimitation according to the invention.
Figure 8:
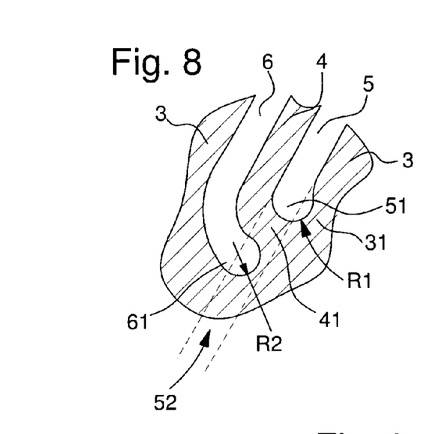
Figure 9:
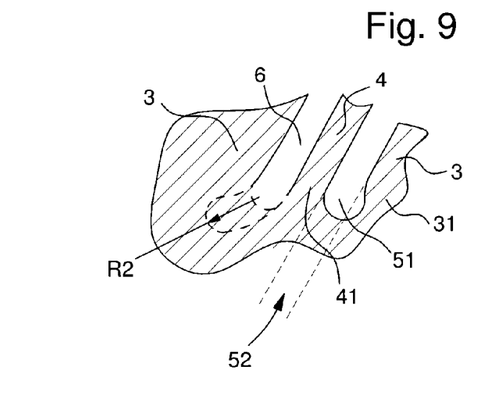
FIG. 9 shows a different configuration which is less advantageous than that of FIG. 8.
Figure 10:
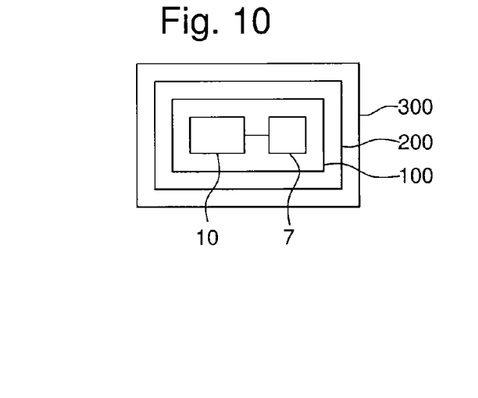
FIG. 10 shows block diagrams of a timepiece including a movement which in turn comprises a gear train including a flexible wheel according to the invention.

FIGS. 2 and 8 illustrate the internal ends 51 and 61 of ventral and dorsal notches 5 and 6, which are curved at respective radii values R1 and R2, which are necessarily both higher than values Rmin1 and Rmin2.

The rigidity of each portion of a tooth 2, in a simplified hypothesis where the thickness of the plate is constant, essentially depends on the length and width of the portion concerned. In the particular embodiment of FIGS. 1 and 2, the length of catch 3, from catch foot 31 thereof, and the length of strip 4, from strip foot 41 thereof, are similar. This may be simplified by explaining that the cube of the width determines the force necessary to obtain a given deflection at the end of the strip or catch. For example, if the ratio of the catch width LE to the strip width LL is four, the force ratio is 64.

In normal operation, where the torque to be overcome is virtually zero, the rigid portion formed by catch 3 does not undergo any significant deformation. To obtain zero play, the flexible portions formed by strips 4 must bend, and it is this bending which is associated with the torque take-off associated with the gearing. In the event of a shock, the situation is very different, since the rigid portion formed by the catch bends significantly, and it is then that its effective rigidity is crucial for shock resistance; the contribution of strips 4 to shock resistance is negligible. However, if these strips 4 are sandwiched between a tooth 71 of an opposing pinion 7 and a rigid catch 3, their deformation must be limited to prevent them from breaking. Thus, advantageously, catch 3 has an intrados profile 36 which is similar to the extra-dorsal profile 42 of strip 4 and an extra-dorsal profile 37 which is similar to intrados profile 43 of strip 4, as seen in FIG. 2. The relative parallelism under stress between the external profiles of the catch and the strip gives wheel 10 better stability in the event of shocks than existing flexible wheels.

Figure 1:
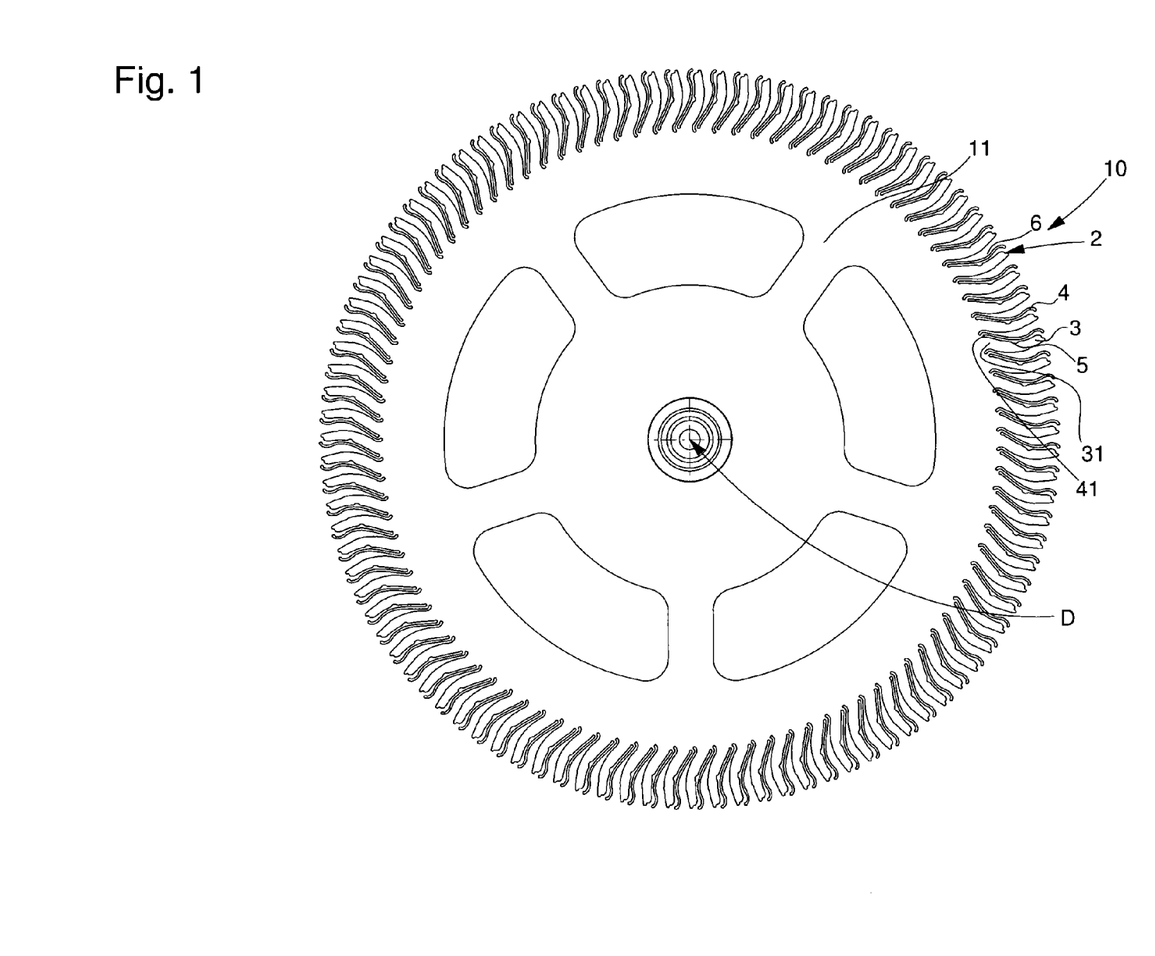
FIG. 1 shows a schematic plan view of a wheel having a flexible toothing according to a first embodiment of the invention.

The width LL of strips 4 is determined by the aspect factor. In the preferred case where all of teeth 2 of the same wheel 10 are joined, as shown in FIG. 1, the width of dorsal notch 6 is limited by the peripheral distribution of teeth 2 on the wheel. FIGS. 1 and 2 illustrate a particular variant, where width LL of strip 4 is constant from strip foot 41 to the distal end 47 thereof, where strip 4 is simply curved at a radius, with a radius greater than or equal to Rmin2. The width of dorsal notch 6, in the free state with no stress, is close or equal to that of strip 4.

A problem therefore arises as to the relative location of these ends 51 and 61, which must give strip 4 sufficient flexibility, properly distribute the stresses applied by a gear train 100, to which the wheel 10 concerned belongs, on said strip 4 (or vice versa), without thereby weakening catch 3 more than necessary. According to the invention, the positions of inner ends 51 and 61 of ventral and dorsal notches 5 and 6 are dimensioned and positioned such that catch 3 has minimal deformation in normal use, and that it can only be bent when a much higher stress than usual is applied, particularly in the event of a shock.

Width LE, in the plane of wheel 10, of catch 3 at catch foot 31 thereof, is greater than three times, and preferably greater than six times the corresponding width LL at strip foot 41. In the variant of FIGS. 1 and 2, the width of catch 3 does not change much over the length thereof, and in the contact area, in an external portion 34 of said catch 3, with an opposing pinion 7 in a gear train 100 in which wheel 100 is incorporated, said width is also more than five times the corresponding width of strip 4 in an inflexion area 48 comprised therein forming the preferred area of contact with pinion 7.

Figures 3, 4:
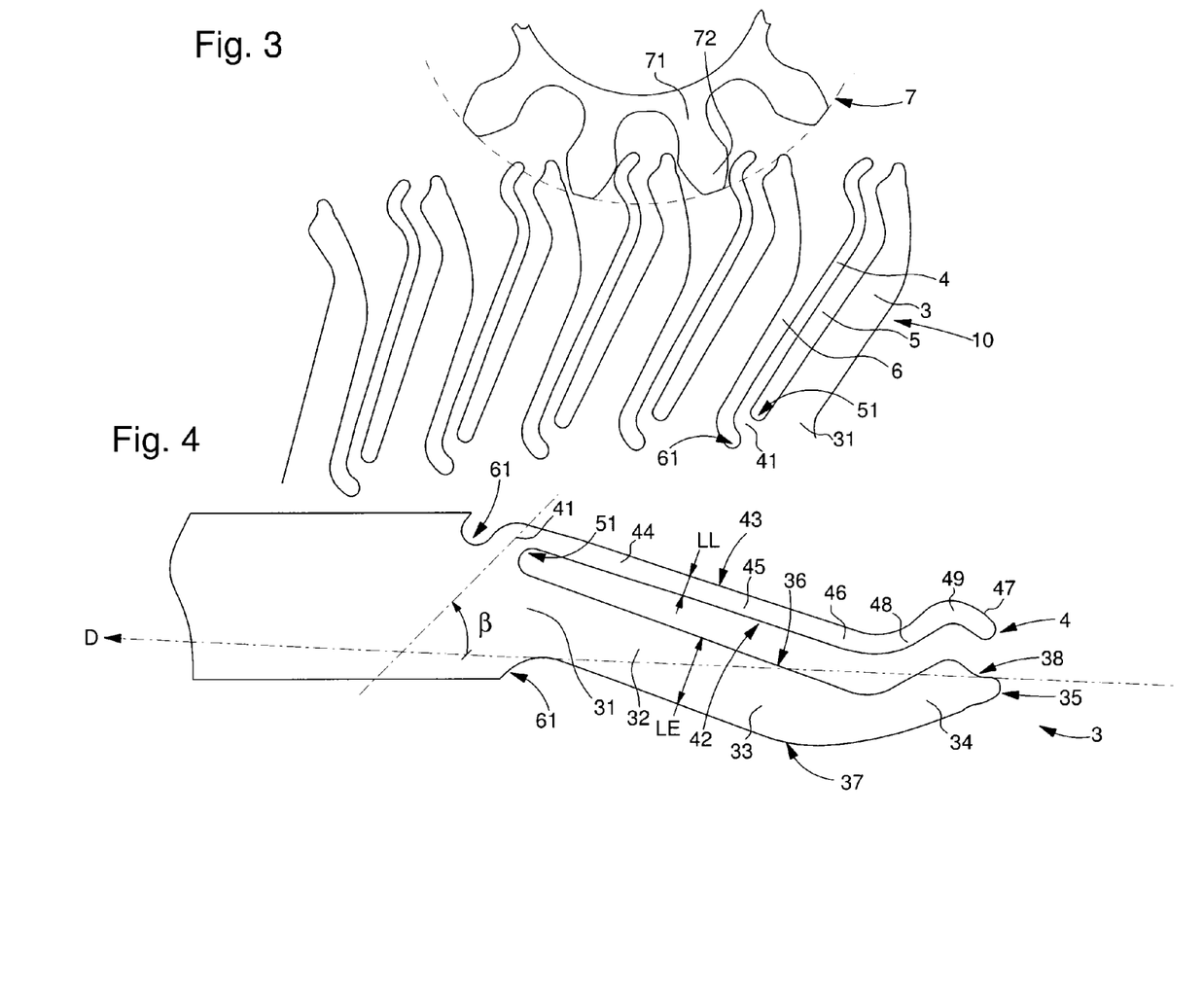
FIG. 3 is a similar diagram to FIG. 2, showing another variant of the invention and another relative position between the rigid pinion and the flexible wheel, wherein there is no strip pressing on one of the catches.
FIG. 4 shows a schematic plan view of an end detail of an integral sector of a wheel according to the FIG. 3 variant, including a catch of this type and a strip of this type.

Naturally, the width of catch 3 of other variants, such as that of FIG. 3, may be tapered, from the foot 31 to the distal end 35 thereof. The important point is that catch 3 has a large width at the base thereof, at the catch foot 3, since this area experiences the greatest stresses in the event of shocks.

Ends 51 and 61 should not be positioned on the same radius value relative to pivot axis D, since this would give too much flexibility, both for catch 3 and strip 4: the section of strip 4 would no longer match the aspect ratio and strip 4 could no longer be manufactured, and catch 3 would be too flexible, i.e. it would have flexibility in normal operation, which is not desirable to maintain a good yield. It is therefore preferably for the distance between end 51 of ventral notch 5 and pivot axis D to be different from the distance between end 61 of dorsal notch 6 and said same axis D.

Likewise, making an end radius R1 or R2 in the axis of symmetry of the ventral notch 5 or dorsal notch 6 at the foot 51 or 61 thereof, is not advantageous as regards the remaining section of strip 4. Consequently, it is preferable, especially when the end radius is greater than the half-width of the notch concerned at the inner end thereof, for this end radius to be offset laterally relative to the axis of notch at the inner end thereof.

End radius R1 of ventral notch 5 cannot be moved away on the side of strip 4, because of the limit stress imposed by the aspect ratio. It can therefore only be moved away on the side of catch 3, as seen in the preferred embodiment of FIG. 2.

End radius R2 of dorsal notch 6 can also not be moved away on the side of strip 4, because of the limit stress imposed by the aspect ratio. It can therefore only be moved away on the side of catch 3, as seen in the preferred embodiment of FIG. 2. However, the rigidity of catch 3 must be maintained in normal gearing operation, and consequently it is not desirable to create too great a local weakness in catch foot 31. This is why, according to the invention, radius R2 is positioned "underneath" radius R1, i.e. closer to pivot axis D than radius R1. The weakening of catch 3 is thus decreased. Moreover, any impact, which reaches the bottom of dorsal notch 6 then has an effect in a substantially radial direction, and therefore right into the solid material.

In short, foot 31 of catch 3 is weakened, on the one hand at radius R1 at the inner end 51 of ventral notch 5, and on the other hand at radius R2 of inner end 6 of dorsal notch 6, which is located closer to axis D than end 51. This gradual weakening maintains the resistance of catch 3 in normal operation, and thus ensures a good yield for the gear train, while providing just enough flexibility in the event of a shock. More specifically, in the usual case, the gear train carries a large seconds hand, with a large unbalance: weakening catch foot 31 according to the invention provides resistance to a usual shock, such as the timepiece being dropped, in accordance with usual experimental values, which are not detailed here.

All things otherwise being equal, the passage of dorsal notch 6 underneath ventral notch 5 extends the active length of strip 4, without weakening catch 3 too much.

This relative positioning of radii R1 and R2 also creates conditions for fitting strip 4, at strip foot 41 thereof, obliquely, at an angle β relative to a radial line originating from pivot axis D and passing through strip foot 41.

Thus, when flexible strip 4 bends, the inner portion 44 thereof tends to pivot about strip foot 41, and distal end 47 undergoes almost one rotation about a point located approximately at one third of the length of strip 4, between inner portion 4 and median area 45, and once this rotation is applied, the intrados profiles 36 of catch 3 and 42 of strip 4 are preferably substantially parallel to each other.

In a particular embodiment, as shown in the Figures, each tooth 2 is separated from the next tooth by a dorsal notch 6.

In a particular embodiment, as seen in the Figures, each tooth 2 includes a catch 3 of this type and a strip 4 of this type. An embodiment with more components is theoretically possible, but the width of the components is limited by the method of obtention and compliance with the aspect ratio, and designing a tooth 2 with only two components, catch 3 and strip 4, allows optimum manufacture and provides these components with sufficient resistance.

In a particular embodiment, as shown in the Figures, notch 6 extends between catch 3 of a tooth 2, and strip 4 and the tooth 2 adjacent to the preceding tooth.

In a particular embodiment illustrated in particular in FIG. 1, ventral notch 5 has substantially parallel edges, and catch 3 includes, between catch foot 31 and a median area 33, an inner, substantially rectilinear portion 32 forming an angle αE of between 10° and 30° and preferably between 15° and 20° with a radial line originating from pivot axis D. This catch 3 further includes, between median area 33 and the distal end 35 thereof the farthest from pivot axis D, an external portion 34 extending substantially radially relative to pivot axis D.

Likewise, between strip foot 41 and a median area 45, strip 4 includes a substantially rectilinear inner portion 44 forming an angle αL of between 10° and 30° and preferably between 15° and 20°, with a radial line originating from pivot axis D, and, between median area 45 and the distal end 47 thereof farthest from pivot axis D, an outer portion 46 extending substantially radially relative to pivot axis D.

When a pinion 7 or opposing wheel of wheel 10 exerts a bearing stress on the distal end 47 of strip 4, this angle αL enables the lever arm to be increased relative to foot 41 of strip 4. In FIG. 2, an arrow symbolises the force applied by a tooth of rigid pinion 7 on flexible arm 4 t, and a double line shows the lever arm on which this thrust force is exerted.

Preferably, the values of angles αE and αL are close or equal; in particular a value of 15° gives good results.

In the particular embodiments of FIGS. 2 and 8, the inner end 51 of ventral notch 5 is curved at a first radius R1. The inner end 61 of dorsal notch 6 is curved at a second radius R2 of greater value than that of first radius R1. Preferably, dorsal notch 6 has a profile which follows, in proximity to inner end 61 thereof, a third radius R3 of higher value than that of second radius R2, so that dorsal notch 6 passes between pivot axis D and inner end 51 of ventral notch 5.

In the variant illustrated in FIG. 1, between strip foot 41 and a median area 45, strip 4 has a substantially rectilinear inner portion 44 forming an angle αL of between 10° and 30° with a radial line originating from pivot axis D. Strip 4 further includes, between median area 45 and the distal end 47 thereof farthest from pivot axis D, an outer portion 46 extending substantially radially relative to pivot axis D, as far as an inflection area 48 between a concave portion defined by inner portion 44 and the outer portion 46 on the one hand, and a convex portion 49 on the other hand as far as distal end 47. This convex portion 49 is arranged to cooperate in abutment on a distal end 35 of catch 3.

The invention also offers the advantage of being insensitive to variations in the distance of centres between pivot axis D of wheel 10 and the pivot axis QPR of an opposing pinion 7.

Figure 5:
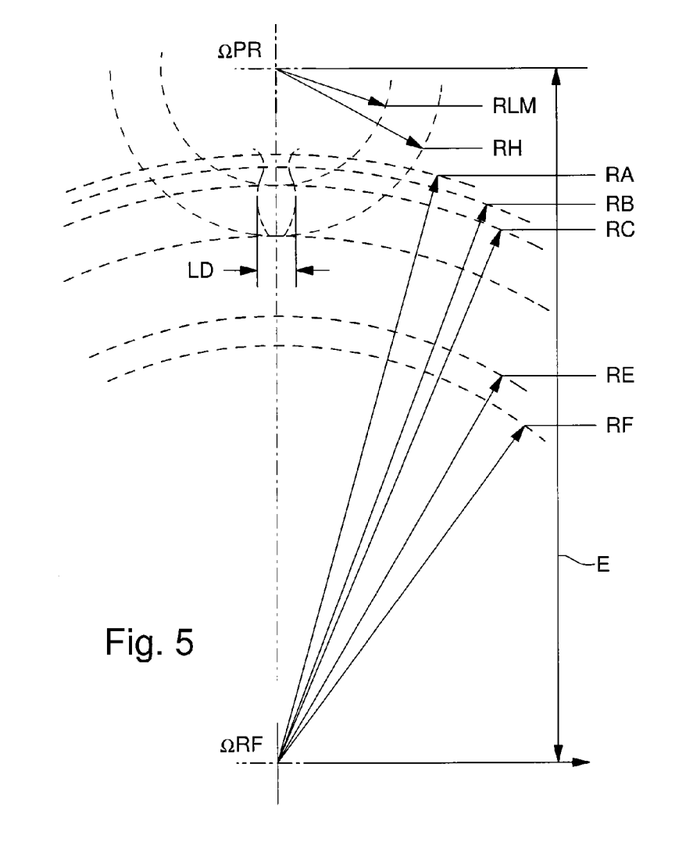
FIG. 5 shows a schematic plan view of the various operating radii of the components of the invention.
Figure 6:
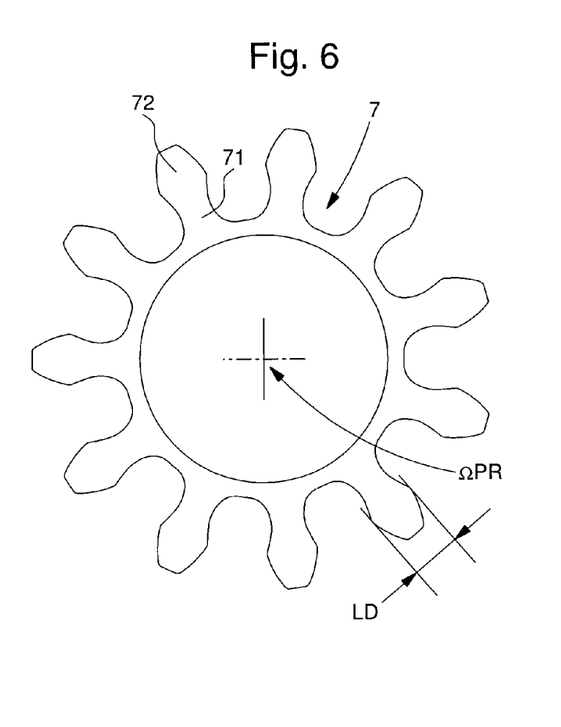
FIG. 6 shows a schematic plan view of a rigid pinion devised to cooperate with a flexible wheel according to FIG. 1.
Figure 7:
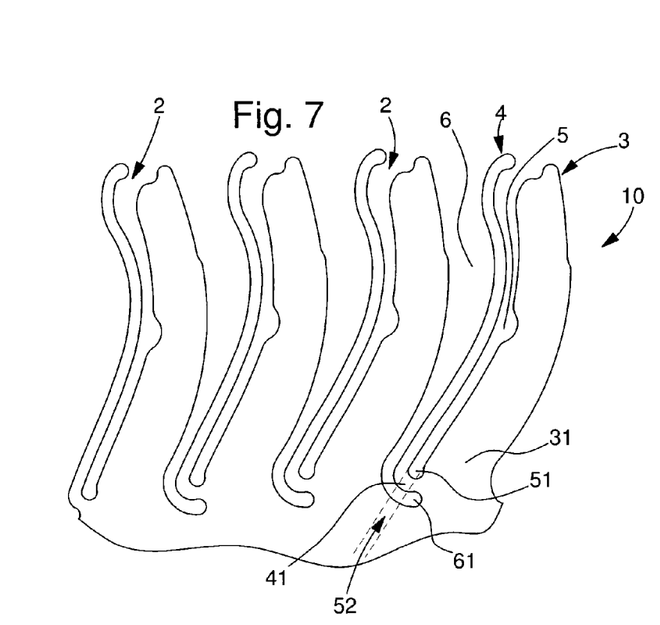
FIG. 7 shows a schematic plan view of a detail of the periphery of a flexible wheel according to the invention, in a different variant from those illustrated in the preceding Figures, and wherein the inner end of a dorsal notch is located between the pivot axis of the wheel and the foot of a nearby catch.

For example, in an NiP embodiment implemented using the "LIGA" (ultraviolet) method, with a modulus of elasticity of around 90 GPa, as illustrated in FIGS. 1, 2 and 5, the plate has a thickness of between 0.10 mm and 0.18 mm.

The variant illustrated in FIGS. 3 and 4 is devised along the same lines as that of FIG. 1, and is designed to come as close as possible to the aspect ratio value 5. The torque take-off and shock resistance of these two variants are similar. To satisfy these criteria, the variant of FIG. 3 comprises 90 teeth, when that of FIG. 1 has 99, and the thickness of the FIG. 3 variant is 0.12 mm, when that of FIG. 1 is 0.15 mm. The depth and inclination of the ventral and dorsal notches are optimised to obtain good behaviour, both in normal gearing and in the event of shocks. In this variant of FIG. 3, the inner portions 44 and 32 of strip 4 and of catch 3 are substantially linear from the respective feet 41 and 31 thereof, while strip 4 and catch 3 of the FIG. 1 variant have a profile closer to an arc of a circle or a parabola, in the inner portions 44 and 32 thereof, continuing into the median portions 45 and 33 thereof. Selecting an aspect ratio of 5.5 for the FIG. 3 variant is compatible with mass production, and, in this case is used with a plate of 0.12 mm thickness.

To clarify, by way of non-limiting example validated by experiments, the geometry of the variant of FIGS. 1 and 2, the distance of centres E is 2.78 mm and allows a variation of +/−0.03 mm. The rigid pinion 7 with 11 teeth has a modulus of 0.052, the maximum teeth width thereof LD is 0.073 mm over a radius of 0.286 mm, and the maximum radius RH of the pinion is 0.35 mm. The wheel 10 with 99 teeth has a maximum radius RA of strip 4 of 2.64 mm, a maximum radius RB of catch 3 of 2.63 mm, a gear radius RC of 2.574 mm, an end radius of ventral notch RE of 2.23 mm, and an end dorsal notch radius RF of 2.19 mm. The width LE of catch 3 is 0.070 mm, the width LL of strip 4 is 0.022 mm. The radius of strip 4 at inflection area 48 is 0.062 mm, said strip 4 also has a concave radius of 0.020 mm at the distal end 47 thereof arranged to bear on the distal end 35 of catch 3.

The expected results are achieved with this geometry:
the gear still has no backlash with a distance of centres increased by 0.03 mm or decreased by 0.03 mm relative to the nominal value. Pinion 7 is thus always in contact with the plate of wheel 10, regardless of their respective pivoting directions: either a flexible strip 4 is wound or the plate is rotated, the contact then occurring on catch 3;
the mean torque take-off does not exceed 5% of the barrel torque with respect to the plate, even with the distance of centres at its lowest value. Strips 4 bend and rub over teeth 71 of pinion 7 and use up the torque;
the most rigid portion of each tooth, formed by catch 3 does not break when, in the event of a shock, the unbalance of a hand carried by the pinion, particularly a small seconds hand, exerts torque on the plate. The traction stresses never exceed the limit of elasticity of Nip, i.e. around 17000 MPa.

A large length of the flexible portion of strip 4 is obtained owing to the inclination of feet 31 and 41 of catches 3 and of strips 4, which is advantageous for reducing the torque take-off. At the minimum distance of centres, the inclination also prevents tooth 71 of pinion 7 from entering into contact with the distal end 3 of catches 3 in an almost arching situation, which would be very disadvantageous.

The invention further concerns a timepiece train 100 comprising at least one wheel 10 of this type geared with an opposing pinion 7, whose teeth 71 comprise an area of maximum section 72 arranged to cooperate in driving abutment with an external portion, substantially radial relative to pivot axis D of wheel 10, of a catch 3 or of a strip 4 of said wheel 10, as seen in FIG. 2.

A preferred application is the obtention of a timepiece gear with no backlash. A particular application is small counters, such as a small seconds, which are not taut in the train, and which are free to move in the set of gears. The invention thus avoids stabilisation via friction, springs or magnets, in order to stabilise a floating hand.

In a preferred embodiment, the area of maximum section 72 cooperates with wheel 10 on a radius corresponding to that of inflection area 48 of strip 4.

Figure 11:
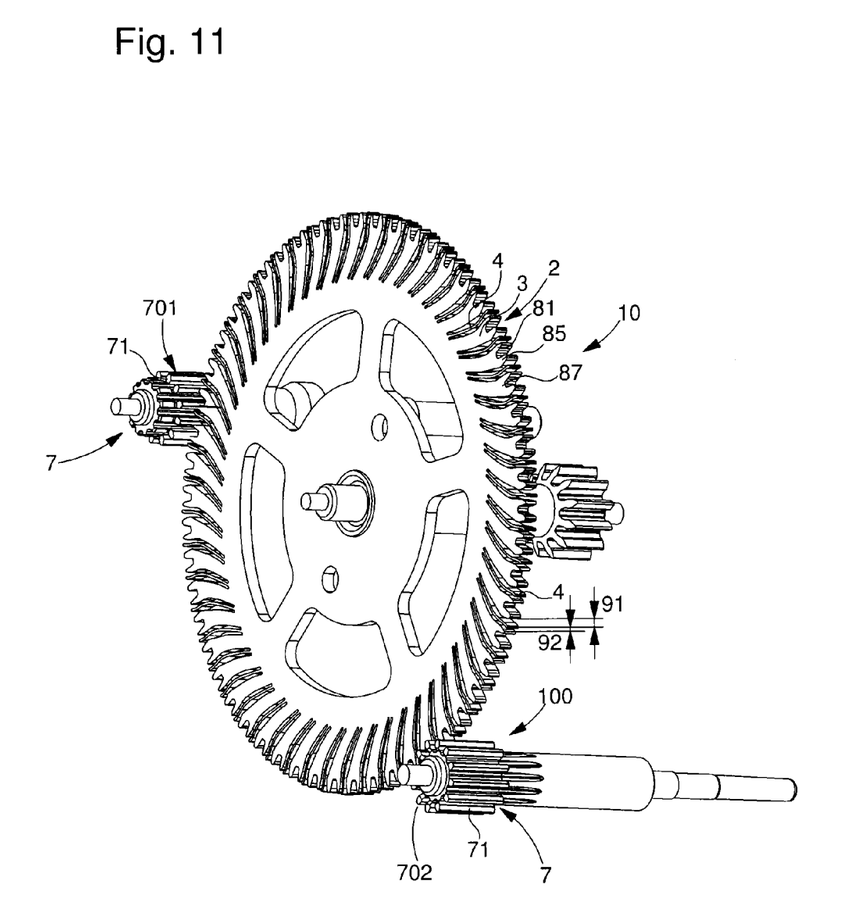
FIG. 11 illustrates an example application with this type of wheel, which is meshed with two pinions: a centre pinion, providing the torque to be transmitted. This pinion drives wheel, which in turn drives a small seconds pinion, onto which there is driven a small seconds hand (not shown)

FIGS. 11 to 14 illustrate a particular version, wherein external portion 34 of catch 3 is forked and includes a first tooth 81 and a second tooth 85 bordering a hollow 87. These two teeth 81 and 85 are each much more rigid than elastic strip 4. Opposing wheel 7 thus meshes once every second time with a flexible strip 4 and once with one of teeth 81 or 85 of catch 3, as seen in the example of FIG. 11, for a small seconds display.

The distal end 47 of elastic strip 4 and those of teeth 81 and 85 are contained within the same cylinder centred on the pivot axis of flexible wheel 10 and, preferably, all of these distal ends are tangent to the same cylinder and have the same maximum radial dimension.

Figure 14:
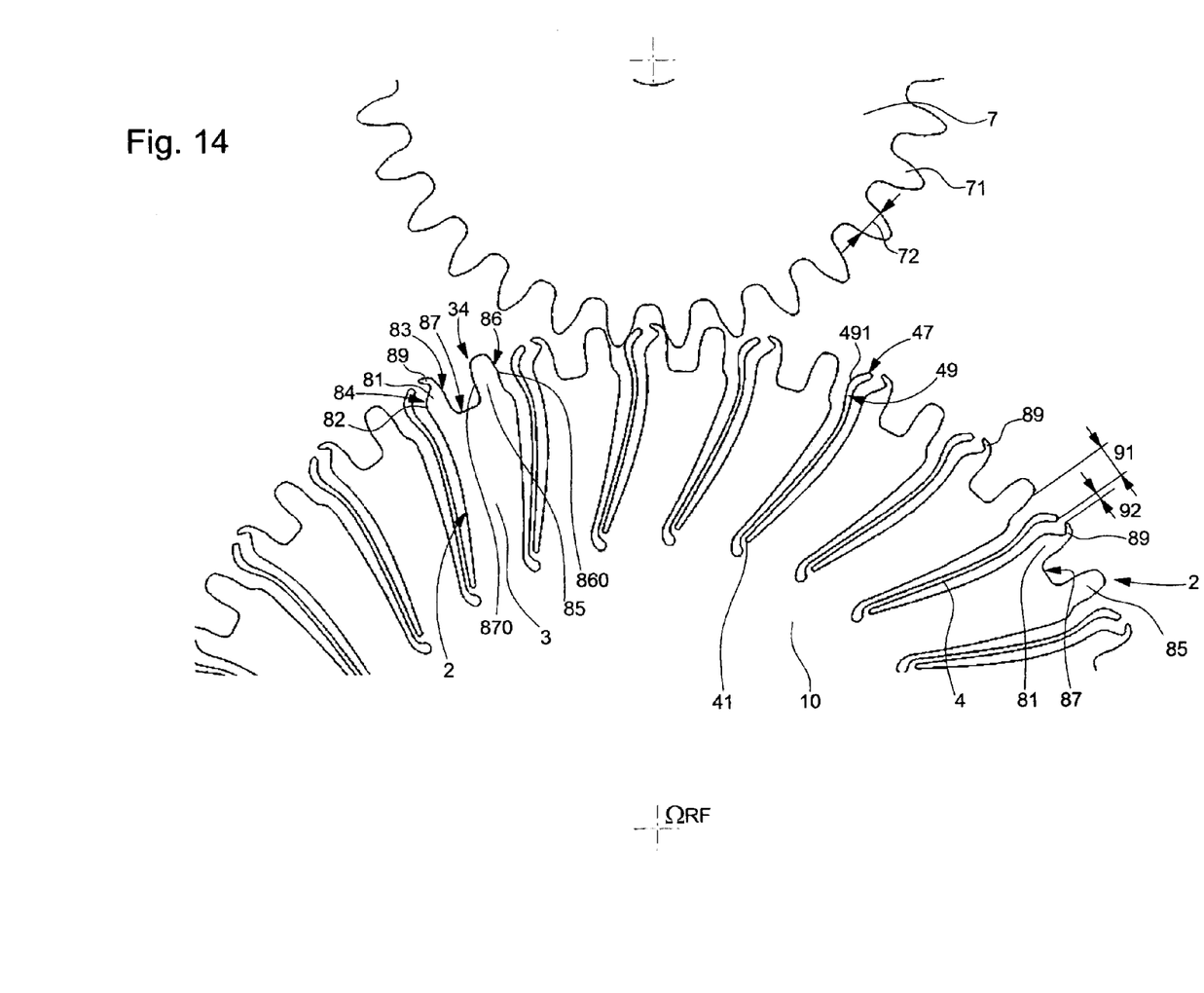
FIG. 14 configuration is devised for driving a date mechanism with hands via the flexible plate forming wheel.

A first tooth 81 is directly opposite the distal end 47 of elastic strip 4 and, on a first flank, adopts a concave profile 84 complementary to the convex profile 49 of said distal end 47, so as to allow abutting cooperation over a relatively broad surface, when, under the action of a tooth 71 of an opposing wheel 7, elastic strip 4 is bent down towards the catch 3 concerned. The opposite flank of said first tooth 81 has a profile 83, particularly an involute to a circle or similar, which is arranged to cooperate with teeth 71 of wheel 7, as seen in FIG. 11 or 14.

This wheel version comprising sets, each formed of a flexible strip 4 and a forked catch 3 ensures the general performance of the movement, in terms of rate, amplitude and resistance to wear, and especially good shock resistance, which is greatly improved. When integrated in a gear train, no "floating" of the small seconds hand is observed. Resistance to wear and ageing is even better than that of the variants of FIGS. 1 to 9, particularly as regards the opposing wheel and the pivots.

The improvement in wear resistance here, compared to the variants of FIGS. 1 to 9, is achieved by removing every second flexible arm. It may be further improved by coating the toothing with a gold layer to improve its tribological properties, decreasing the stresses in the gearing, or reducing the wind of the flexible arms.

With regard to decreasing stresses in the gearing, care must be taken to ensure there is no play at the maximum distance of centres. The geometry of rigid teeth 81 and 84 and flexible tooth 4 is studied to ensure there is also no play in the gearing at the maximum distance of centres (chosen here on the basis of the nominal distance of centres, increased by 30 micrometres).

The FIG. 14 configuration is devised for driving a date mechanism with hands via the flexible plate forming wheel 1.

To facilitate assembly, and to avoid placing the pinion tooth on the wrong side of the flexible arm, or even breaking a flexible arm, wheel 10 advantageously has small hooks 89 at the end of rigid teeth 81 which work with elastic strips 4. The object is to have the correct side of elastic strip 4 which has a first aperture 91, considerably larger than the second aperture 92 on the other side, as seen in FIG. 14. Thus, during assembly, teeth 71 of opposing wheel 7 are easily positioned in the right place.

Flexible wheel 10 according to the invention is devised to operate in both directions. FIG. 11 illustrates an example application with this type of wheel 10, which is meshed with two pinions: a centre pinion 701, providing the torque to be transmitted. This pinion 701 drives wheel 10, which in turn drives a small seconds pinion 702, onto which there is driven a small seconds hand. Consequently, the toothing of wheel 10 does not operate in the same manner with centre pinion 701 as it does with small seconds pinion 702. In the first case, elastic strips 4 are always deformed as much as possible, until they touch the rigid portion formed by the closest tooth 81. This contact must not then cause jamming, in particular when the distance of centres is at the minimum tolerance, whereas in the second case, elastic strips 4 do not, in principle, come into contact with rigid portions 81 or 85, except in the event of a shock. Of course, in both gearings, there must be never be any play.

Opposing wheel 7 may be achieved with various types of teeth, in particular, but in a non-limiting manner:
either with very wide teeth, of almost square profile, facilitating the reduction in play. This profile is devised to reduce play rather than to ensure improved transmission and torque/yield efficiency;
or with a standard involute profile, which is more useful for torque transmission efficiency than for the problem of play. The end position of the elastic strip must then be adjusted to cancel out play with this profile too.

The methodology of design is complex, and requires long simulations and iterations. Starting with standard rigid profiles, an elastic strip shape which cancels out play is drawn at the minimum distance of centres. Simulation checking concerns all the angular positions of the distance of centres. In each angular position it is checked that there is no play, and the profile of the strip is modified to achieve this first condition. The next check concerns simulation in both pivoting directions. In particular, when opposing wheel 7 is driving, it is checked whether elastic strip 4 is abutting on the tooth which forms the rigid portion, and whether the contact is causing any jamming or undesirable stresses in the elastic strips. This simulation has to be carried out in all angular positions, and at the various distances of centres between the minimum distance of centres and the maximum distance of centres. The profile is corrected as many times as necessary to achieve the desired result.

In the case, for example of FIG. 11, where severe stresses in terms of torque take-off and shock resistance must be dealt with, the shape of the rigid and flexible portions must be further optimised, and in particular elastic strips 4 must be lengthened to make them more flexible, and bent to keep the rigid portion sufficiently wide at the bottom of the toothing to resist shocks.

According to the variants, flexible strip 4 occupies a variable position in the gap between the two closest rigid teeth 81 and 85.

Figure 12:
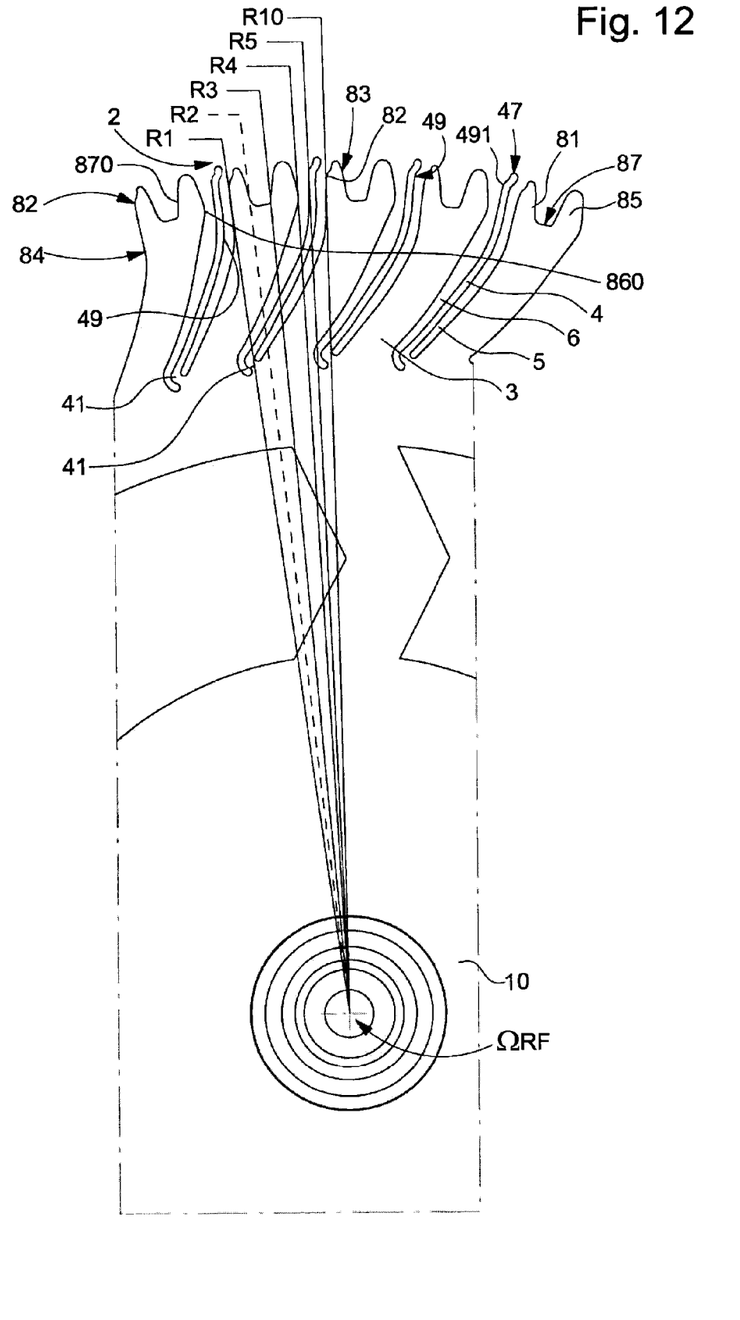
FIG. 12 and FIG. 13 illustrate particular versions which will be described hereafter.

FIG. 12 illustrates a variant where, in an unrestricted configuration at rest, the free spaces and the ends of strip 4 and of teeth 81 and 85 are distributed as follows:
an overall angular sector, originating from the centre ΩRF of flexible wheel 10, is defined between a radius R1 tangent to a salient point 82 of first tooth 81, on the side of strip 4, and between a similar radius R10 of the following group of teeth. Wheel 10 is shown here in a preferred but non-limiting embodiment, where it is formed of a set of groups of identical teeth arranged periodically at the periphery of the wheel. This angular sector is shared between five sectors of substantially equal angular amplitude:
the first between radius R1 and a radius R2 passing through foot 41 of the next strip 4. This sector contains the entire first tooth 81;
the second between radius R2 and a radius R3 tangent to second tooth 85, on the side of tooth hollow 87, at a point 870. This sector corresponds to the entire tooth hollow 87;
the third between radius R3 and a radius R4 tangent to the other side of second tooth 85, at a point 860. This sector contains the entire second tooth 85;
the fourth between radius R4 and a radius R5 tangent to elastic strip 4 at a salient point 491 on the side thereof facing second tooth 85. This sector is empty;
the fifth between radius R5 and radius R10. This sector contains the entire distal end 47 of strip 4.

Figure 13:
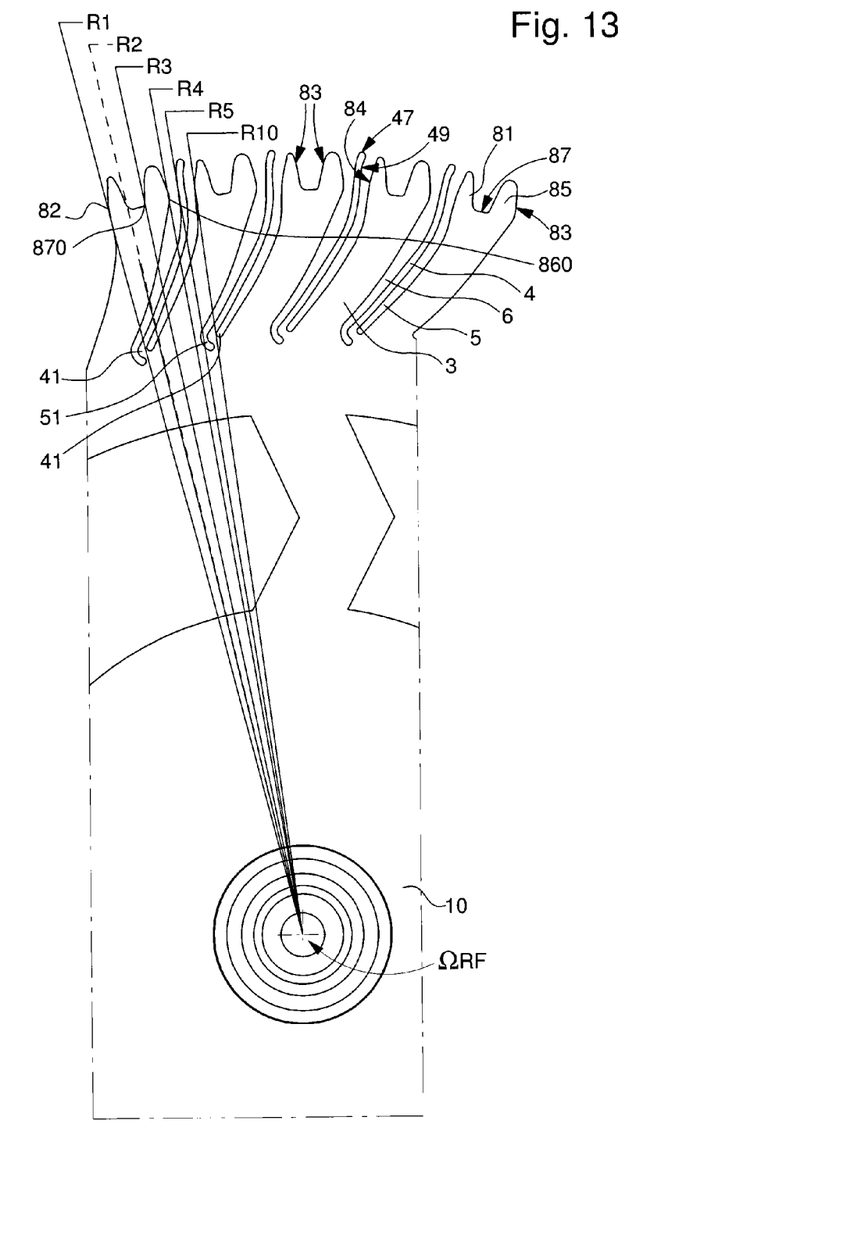

FIG. 13 illustrates a variant where, in an unrestricted configuration at rest, the free spaces and the ends of strip 4 and of teeth 81 and 85 are distributed as follows:
an overall angular sector, originating from the centre ΩRF of flexible wheel 10, is defined between a radius R1 passing through strip 4 of the group of teeth concerned, and tangent to a salient point 82 of first tooth 81, on the side of strip 4, and between a similar radius R10 of the following group of teeth. Wheel 10 is shown here in a preferred but non-limiting embodiment, where it is formed of a set of groups of identical teeth arranged periodically at the periphery of the wheel. This overall angular sector is shared between five sectors of substantially equal angular amplitude:
the first between radius R1 and a radius R2 defining therewith a fifth overall angular sector. This sector contains the entire first tooth 81;
the second between radius R2 and a radius R3 tangent to second tooth 85, on the side of tooth hollow 87, at a point 870. This sector corresponds to the entire tooth hollow 87;
the third between radius R3 and a radius R4 tangent to the other side of second tooth 85, at a point 860. This sector contains the entire second tooth 85;
the fourth between radius R4 and a radius R5 derived from inner end 51 of ventral notch 5 of the following group of teeth. This sector is empty;
the fifth between radius R5 and radius R10. This sector contains the entire distal end 47 of strip 4.

The invention also concerns a timepiece movement 200 including at least one train 100 of this type.

The invention also concerns a timepiece 300 including at least one timepiece movement 200 of this type, and/or at least one train 100 of this type.

What is claimed is:
1. A timepiece wheel comprising teeth with play compensation each including a catch projecting from a catch foot, and an elastic strip projecting from a strip foot opposite said catch from which said strip is separated by a ventral notch and an intrados profile of which, on the side opposite said catch, delimits a dorsal notch, said strip foot being delimited, towards the pivot axis of said wheel, by an inner end of said ventral notch and by an inner end of said dorsal notch, wherein said inner end of said dorsal notch is located closer to said axis than said inner end of said ventral notch, and extends, on the side of said axis, underneath said catch foot or underneath the inner curvilinear geometrical extension of said ventral notch towards said pivot axis.

2. The wheel for a timepiece mechanism according to claim 1, wherein each said tooth is separated from the next tooth by said dorsal notch.

3. The wheel for a timepiece mechanism according to claim 1, wherein each of the teeth of said wheel include a said catch and a said strip.

4. The wheel for a timepiece mechanism according to claim 3, wherein said dorsal notch extends between said catch and said strip.

5. The wheel for a timepiece mechanism according to claim 1, wherein said ventral notch has substantially parallel edges, and wherein, between said catch foot and a median area, said catch includes a substantially rectilinear inner portion forming an angle of between 10° and 30° with a radial line originating from said pivot axis, and, between said median area and the distal end thereof farthest from said pivot axis, an outer portion extending substantially radially relative to said pivot axis, and wherein, between said strip foot and a median area, said strip includes a substantially rectilinear inner portion forming an angle of between 10° and 30° with a radial line originating from said pivot axis, and between said median area and the distal end thereof farthest from said pivot axis, an outer portion extending substantially radially relative to said pivot axis, said angle allowing the lever arm to be increased relative to said foot of said strip when an opposing wheel or pinion of said wheel exerts a pressing stress on said distal end of said strip.

6. The wheel for a timepiece mechanism according to claim 1, wherein said inner end of said ventral notch is curved at a first radius, and wherein said inner end of said dorsal notch is curved at a second radius of higher value than that of said first radius, and wherein, in proximity to said inner end thereof, said dorsal notch has a profile which follows a third radius of higher value than that of said second radius, so as to cause said dorsal notch to pass between said pivot axis and said inner end of said ventral notch.

7. The wheel for a timepiece mechanism according to claim 1, wherein said catch is forked and includes a first tooth and a second tooth bordering a hollow, said first tooth and said second tooth each being much more rigid than said elastic strip.

8. The wheel for a timepiece mechanism according to claim 7, wherein said distal end of said elastic strip, and the distal ends of said first tooth and of said second tooth have the same maximum radial dimension.

9. The wheel for a timepiece mechanism according to claim 1, wherein, between said strip foot and a median area, said strip includes a substantially rectilinear inner portion forming an angle of between 10° and 30° with a radial line originating from said pivot axis and, between said median area and the distal end thereof farthest from said pivot axis, an outer portion extending substantially radially relative to said pivot axis, as far as an inflection area between a concave portion defined by said inner portion and said outer portion on the one hand, and a convex portion on the other hand as far as said distal end, said convex portion being arranged to cooperate in abutment on a distal end of said catch.

10. The timepiece train according to claim 9, wherein said area of maximum section cooperates with said wheel on a radius corresponding to that of said inflection area.

11. The timepiece including at least one train according to claim 10.

12. The timepiece train comprising at least one wheel according to claim 1, wherein said wheel is geared with an opposing pinion whose teeth comprise an area of maximum section arranged to cooperate in driving abutment with an external portion, substantially radial to said pivot axis of said wheel, of a said catch or of a said strip.

13. The timepiece including at least one train according to claim 12.

* * * * *